(12) United States Patent
Corke et al.

(10) Patent No.: US 10,812,172 B1
(45) Date of Patent: Oct. 20, 2020

(54) DEVICE AND METHOD TO DETERMINE INCOMING COMMUNICATIONS

(71) Applicant: MOTOROLA SOLUTIONS, INC., Chicago, IL (US)

(72) Inventors: Robert J. Corke, Glen Ellyn, IL (US); Dean H. Skuldt, Arlington Heights, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/592,926

(22) Filed: Oct. 4, 2019

(51) Int. Cl.
*H04B 7/08* (2006.01)
*H04B 1/16* (2006.01)
*H04B 17/318* (2015.01)
*H04L 5/00* (2006.01)
*H04W 16/28* (2009.01)

(52) U.S. Cl.
CPC ............. *H04B 7/0862* (2013.01); *H04B 1/16* (2013.01); *H04B 17/318* (2015.01); *H04L 5/0048* (2013.01); *H04W 16/28* (2013.01)

(58) Field of Classification Search
CPC ........ H04B 1/16; H04B 7/0862; H04B 17/20; H04B 17/318; H04B 17/391; H04L 5/0048; H04W 16/28; H01Q 1/50; H01Q 21/061
See application file for complete search history.

(56) References Cited

U.S. PATENT DOCUMENTS

| | | | |
|---|---|---|---|
| 6,400,317 B2 | 6/2002 | Rouphael | |
| 2006/0284768 A1* | 12/2006 | Pauplis | H04B 17/20 342/368 |
| 2008/0075033 A1* | 3/2008 | Shattil | H04B 7/026 370/328 |
| 2008/0089267 A1* | 4/2008 | Zhu | H04B 7/15507 370/315 |
| 2008/0240280 A1 | 10/2008 | Li | |
| 2019/0296821 A1* | 9/2019 | Choi | H04B 7/0617 |

FOREIGN PATENT DOCUMENTS

CN 105515633 A 4/2016

* cited by examiner

*Primary Examiner* — Thanh C Le
(74) *Attorney, Agent, or Firm* — Perry + Currier, Inc.

(57) ABSTRACT

A device and method to determine incoming communications is provided. A device in communication an array of antenna devices determines respective quality metric weights for respective signal data representing respective signals received by the antenna devices. The device applies the respective quality metric weights to the respective signal data to determine total received signal data. The device determines, based on the total received signal data, that the array of the antenna devices has received an incoming communication.

19 Claims, 4 Drawing Sheets

DEVICE AND METHOD TO DETERMINE INCOMING COMMUNICATIONS

BACKGROUND OF THE INVENTION

A beamforming receiver performs spatial filtering via antenna array processing in order to provide directivity and mitigate co-channel interference. However, performance may be degraded by the deviation from an ideal array response pattern due to antenna perturbations. These perturbations may be attributed to factors such as polarity mismatch, near field reflections and shadowing from platform geometry, as well as superposition of co-channel signals. These impairments may be temporally and/or spatially varying, and may result in individual antennas of an antenna array exhibiting different perturbations at different times for a same angle of arrival. That is, the individual antenna responses may be random processes in time. Such random processes may lead to reductions in beamforming combining gain and/or errors in determining when an incoming communication is received.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
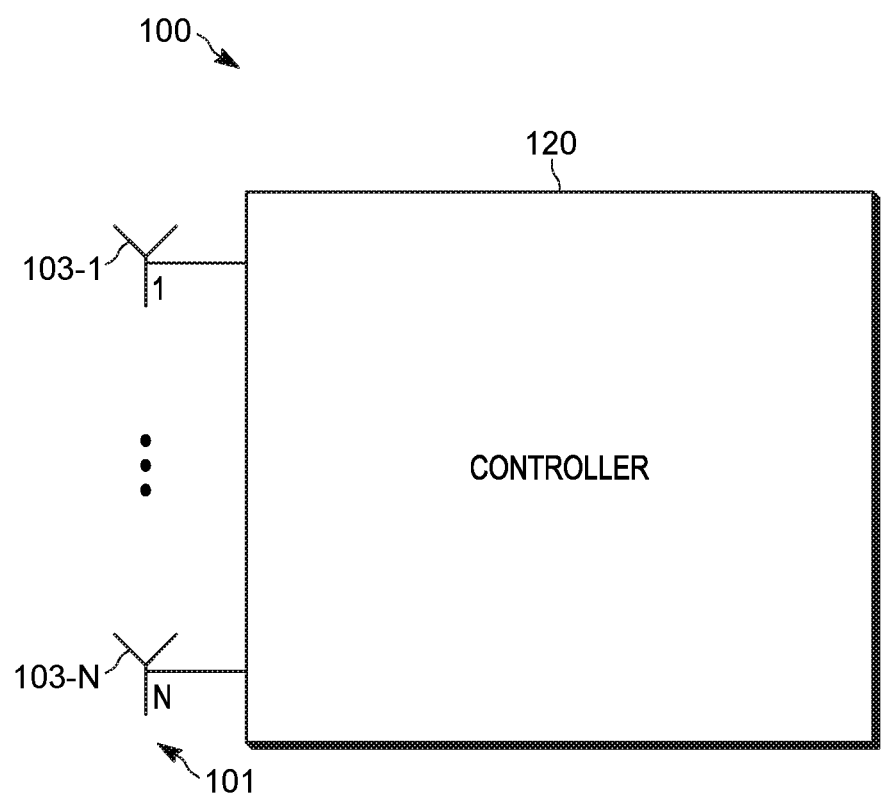
FIG. 1 is a device to determine incoming communications, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

A beamforming receiver performs spatial filtering via antenna array processing in order to provide directivity and mitigate co-channel interference. However, performance may be degraded by the deviation from an ideal array response pattern due to antenna perturbations. These perturbations may be attributed to factors such as polarity mismatch, near field reflections and shadowing from platform geometry, as well as superposition of co-channel signals. These impairments may be temporally and/or spatially varying, and may result in individual antennas of an antenna array exhibiting different perturbations at different times for a same angle of arrival. That is, the individual antenna responses may be random processes in time. Such random processes may lead to reductions in beamforming combining gain and/or errors in determining when an incoming communication is received.

Hence, provided herein is a device, such as a receiver, and/or a transceiver, which applies a quality metric weight to signal data representing respective signals received by individual antennas of an antenna array. For example, the quality metric weights may be based on comparing a set of signal data for one antenna with reference signal data representing a reference signal and/or an expected signal. An example of a quality metric weight may be a peak-to-average power ratio in which received signal data from each antenna device is correlated with reference signal data over a correlation time and compared to the average power of the received signal data over the correlation time. The respective quality metric weights are applied to the respective signal data, for example along with respective spatial weights, to determine total received signal data representing a total received signal. Signal data for low quality signals may be given a lower quality metric weight than signal data for high quality signals, and hence the contributions of the high quality signal data to the total received signal data may be better and/or higher than the contributions of the low quality signal data. A better assessment of whether the total received signal data represents an incoming communication, or not, may then occur, as compared to assessing total received signal data determined without using quality metric weights.

An aspect of the specification provides a device comprising: an array of antenna devices; and a controller configured to: determine respective quality metric weights for respective signal data representing respective signals received by the antenna devices; apply the respective quality metric weights to the respective signal data to determine total received signal data; and determine, based on the total received signal data, that the array of the antenna devices has received an incoming communication. The device may comprise a receiver, a transceiver and/or a receiving component of a transceiver, and the like.

Another aspect of the specification provides a method comprising: determining, at a device, respective quality metric weights for respective signal data representing respective signals received by antenna devices of an array of the antenna devices; applying, at the device, the respective quality metric weights to the respective signal data to determine total received signal data; and determining, based on the total received signal data, that the array of the antenna devices has received an incoming communication.

Attention is directed to FIG. 1 which depicts a device 100 to determine incoming communications. As seen in FIG. 1, the device 100 comprises an array 101 of antenna devices 103-1 . . . 103-N, and a controller 120. The antenna devices 103-1 . . . 103-N may be interchangeably referred to, collectively, as the antenna devices 103 and, generically, as an antenna device 103. As depicted, there is a number "N" of antenna devices 103, where "N" is an integer number greater than "1". In particular examples there may be eight (e.g., N=8) antenna devices 103, however any suitable number of antenna devices 103 is within the scope of the present specification.

The antenna devices 103 are generally arranged (e.g., in the array 101) as a phased array of antenna devices 103, and each antenna device 103 may receive a respective signal, which may alternatively be referred to as a waveform. A signal may be converted to signal data by the controller 120 and combined, by the controller 120, by applying spatial weights to the signal data. The weighted signal data is added together to determine total signal data representing a total signal received at the array 101. A metric of the total signal data may be determined, and the metric may be compared, by the controller 120, to a threshold to determine whether an incoming communication has been received or not received. Such a metric is described in more detail below.

The device 100 may comprise a receiver and/or transceiver and/or a receiver component of a transceiver, and the like. Indeed, the antenna devices 103 may be used to receive signals and transmit signals. The controller 120 is generally configured to receive the signals from the antenna devices 103 and convert the signals to signal data, which represent the data received in the signals, and/or shapes of the signals, and/or modulation of the signals, and the like.

Figure 2:
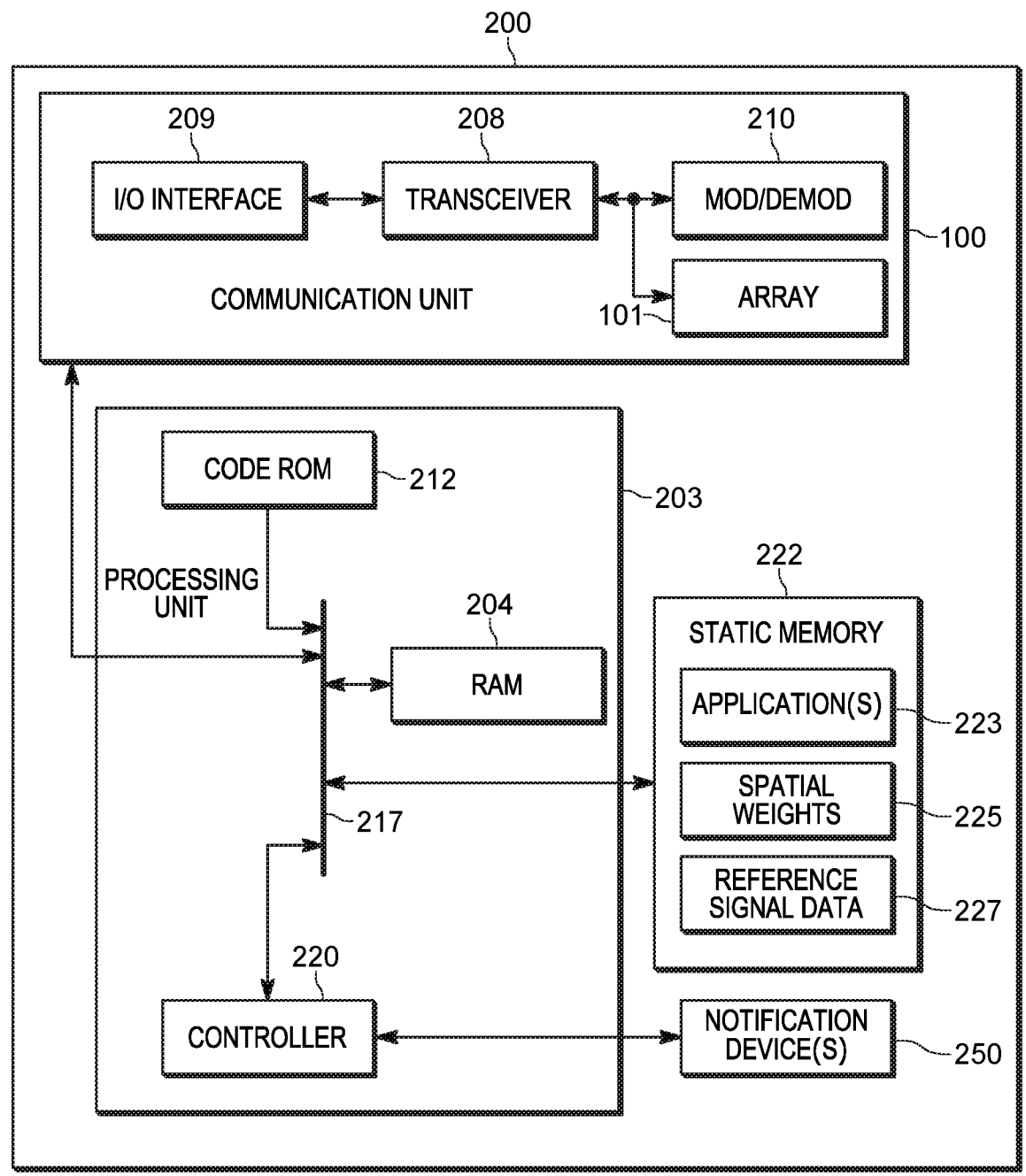
FIG. 2 is a device diagram showing a device structure of a radio device that incorporates the device of FIG. 1, in accordance with some examples.

Attention is next directed to FIG. 2 which depicts a device 200 which comprises the device 100. The device 200 may include any suitable device that communicates wirelessly using an array of antennas including, but not limited to, a radio, a mobile phone, a laptop computer, and the like. However, while such examples include portable devices, in other examples the device 200 may not be portable. For example the device 200 may comprise any device which communicates via an array of antennas including, but not limited to large-scale arrays of antennas; indeed, in some of these examples, the array 101 of antenna devices 103 may be external to the device 200 and/or the device 100 may be external to the device 200.

As depicted, the device 200 comprises: the device 100 implemented, for example, as a communication unit, a processing unit 203, a Random-Access Memory (RAM) 204, one or more wireless transceivers 208, one or more wired and/or wireless input/output (I/O) interfaces 209, a combined modulator/demodulator 210, a code Read Only Memory (ROM) 212, a common data and address bus 217, a controller 220, and a static memory 222 storing at least one application 223. Hereafter, the at least one application 223 will be interchangeably referred to as the application 223.

While not depicted, the device 200 may include one or more of an input device and/or a display screen and/or a speaker and/or microphone, and the like, such that a user may interact with the device 200. The device 200 may comprise one or more notification devices 250 including, but not limited to, a speaker, a display screen, a haptic device, and the like.

As depicted in FIG. 2, the device 200 includes the device 100 communicatively coupled to the common data and address bus 217 of the processing unit 203. The controller 120 of the device 100 and the controller 220 may be the same or different from one another (e.g., the device 100 may be distributed through the device 200) and/or the controllers 120, 220 may share processing resources and/or other resources of the device 200, such as the memory 222.

Furthermore, while the device 100 comprises a transceiver, the device 100 may be implemented as a receiver and/or a transceiver and/or a combination of a receiver and a transmitter. Regardless, the device 100 is generally configured to receive signals via the array 101, which may include incoming communications.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory 204 and the static memory 222.

The device 100 may include one or more wired and/or wireless input/output (I/O) interfaces 209 that are configurable to communicate with one or more wired and/or wireless communication networks, and the like. For example, the device 100 may include wireless transceivers 208 for communicating with one or more communication networks, and the like. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) networks, a 5G network, a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a Bluetooth transceiver, a Wi-Fi transceiver, a WiMAX transceiver, and/or another similar type of wireless transceiver configurable to communicate via a wireless radio network. The array 101 and/or the antenna devices 103 may be adapted accordingly. The transceiver 208 is also coupled to a combined modulator/demodulator 210.

The device 100 may include one or more optional wireline transceivers, and the like, such as an Ethernet transceiver, a USB (Universal Serial Bus) transceiver, or similar transceiver configurable to communicate via a twisted pair wire, a coaxial cable, a fiber-optic link, or a similar physical connection to a wireline network.

The controller 220 may include ports (e.g., hardware ports) for coupling to other hardware components of the device 100.

The controllers 120, 220 includes one or more logic circuits, one or more processors, one or more microprocessors, one or more ASIC (application-specific integrated circuits) and one or more FPGA (field-programmable gate arrays), and/or another electronic device. In some examples, the controllers 120, 220 and/or the device 100 are not generic controllers and/or a generic device, but a device specifically configured to implement functionality to determine incoming communications. for example, in some examples, the device 100 and/or the controllers 120, 220 specifically comprises a computer executable engine configured to implement functionality to determine incoming communications.

The static memory 222 is a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functional teachings of the device 100 as described herein are maintained, persistently, at the memory 222 and used by the controller 120 (and/or the controller 220) which makes appropriate utilization of volatile storage during the execution of such programming instructions.

Figure 3:
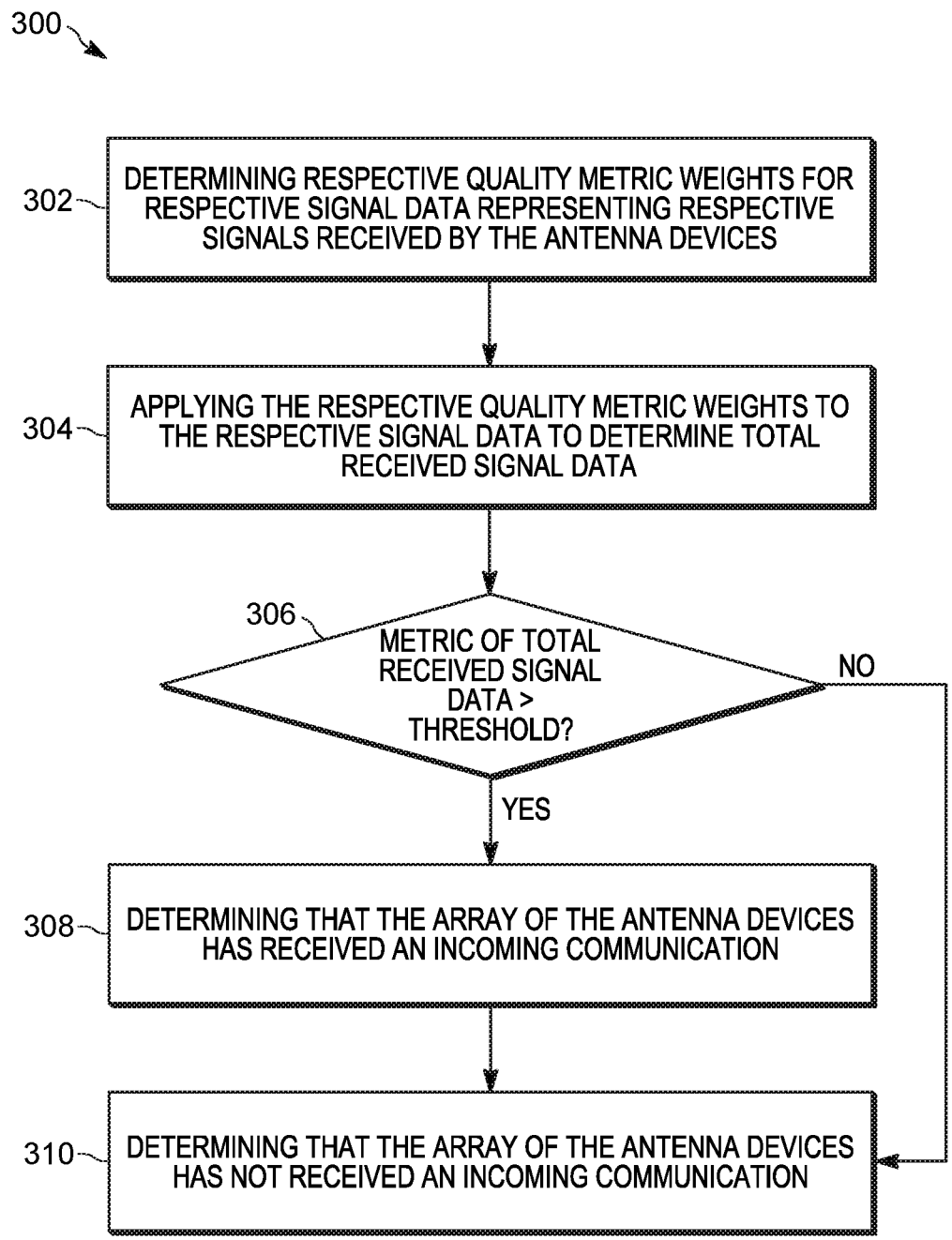
FIG. 3 is a flowchart of a method for determining incoming communications, in accordance with some examples.

In particular, the memory 222 stores instructions corresponding to the at least one application 223 that, when executed by the controller 120 (and/or the controller 220), enables the controller 120 (and/or the controller 220) to implement functionality to determine incoming communications including, but not limited to, the blocks of the method set forth in FIG. 3. In illustrated examples, when the controller 120 (and/or the controller 220) executes the one or more applications 223, the controller 120 (and/or the controller 220) is enabled to: determine respective quality metric weights for respective signal data representing respective signals received by the antenna devices 103; apply the respective quality metric weights to the respective signal data to determine total received signal data; and determine, based on the total received signal data, that the array of the antenna devices 103 has received an incoming communication.

For example, as depicted the memory 222 further stores spatial weights of the antenna devices 103 (e.g., a respective spatial weight 225 for each of the antenna devices 103) which may comprise a respective phase for a given antenna device 103, and the like.

As depicted, the memory 222 further stores reference signal data 227 which may be predetermined and populated at the memory 222 for example when the device 200 is configured for deployment (e.g., in a configuration process used during manufacture of the device 200, and the like). Alternatively, the reference signal data 227 may be deployed at the memory 222 by a system administrator and/or a system administrator device of a system that includes the device 200, and the like (e.g., the device 200 may be managed and/or deployed by an entity, such as a public-safety entity, a business, a service provider and the like, and a system administrator may deploy the reference signal data 227 at the memory 222). Signals of some types of communication networks may include a preamble which is a sequence of a signal that indicates a reference carrier signal and/or a reference modulated signal. However, signals of other types of communication networks (including, but not limited to LTE networks) may not include a preamble but may include reference points indicating a reference carrier signal, for example in training sequences. Regardless, the reference signal data 227 may represent a reference carrier signal, and the like. In particular examples, the reference signal data 227 may represent a GSM Frequency Correction Channel (FCCH) signal.

While the device 100 is described hereafter with reference to the memory 222 storing the application 223, the spatial weights 225 and the reference signal data 227, in other examples the device 100 may include a memory storing the application 223, the spatial weights 225 and the reference signal data 227 (e.g., a memory of the communication unit which represents the device 100 in FIG. 2).

Attention is now directed to FIG. 3 which depicts a flowchart representative of a method 300 for determining incoming communications. The operations of the method 300 of FIG. 3 correspond to machine readable instructions that are executed by the device 100, and specifically the controller 120 of the device 100. In the illustrated example, the instructions represented by the blocks of FIG. 3 are stored at the memory 222 for example, as the application 223. The method 300 of FIG. 3 is one way in which the controller 220 and/or the device 100 may be configured. Furthermore, the following discussion of the method 300 of FIG. 3 will lead to a further understanding of the device 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps."

At a block 302, the controller 120 and/or the device 100 determines respective quality metric weights for respective signal data representing respective signals received by the antenna devices 103. It is understood, in the block 302, that the antenna devices 103 have received respective signals and the controller 120 and/or the device 100 has converted the respective signals received for each of the antenna devices 103 to respective sets of signal data.

In some examples the respective quality metric weights may comprise a peak-to-average power ratio, for example for each of the antenna devices 103, which may be determined by comparing a respective set of signal data with the reference signal data 227, to determine a correlation therebetween over a correlation time (e.g., a period of a reference signal), which may be represented by correlated power (e.g., a peak), and comparing the peak of the correlation, with an average power of the respective set of signal data. An example of determining peak-to-average power ratio is described below with respect to FIG. 4. In these examples, a peak-to-average power ratio is determined for each of the signals received by the antenna devices 103.

Put another way, the controller 120 and/or the device may be configured to determine the respective quality metric weights by comparing the respective signal data to reference signal data 227 stored at a memory (e.g., the memory 222) accessible to the controller 120, the reference signal data 227 corresponding to a reference signal. The reference signal data 227 is generally predetermined and stored at the memory 222, as described above.

While the quality metric weights are described heretofore with respect to peak-to-average power ratios, the respective quality metric weights may comprise any suitable quality metric weights derived from one or more of: peak-to-average power ratios; eigen decomposition weight; singular value decomposition; and principle component analysis; and the like.

At a block 304, the controller 120 and/or the device 100 applies the respective quality metric weights to the respective signal data to determine total received signal data. For example, each set of respective signal data may be adjusted by combining the respective signal data with respective determined quality metric weights. For example, a quality metric weight may comprise a number which is relatively higher for a respective signal for a respective antenna device 103 that has lower perturbations (e.g., the respective signal is of high quality) and relatively lower for a respective signal for another respective antenna device 103 that has higher perturbations (e.g., the respective signal is of low quality). The perturbations may be for a given spatial location, and the like.

A set of respective signal data may be further adjusted by applying a respective spatial weight 225 thereto to account for phase differences between the respective signals.

The resulting sets of weighted respective signal data may then be summed and/or combined and/or linearly combined to arrive at total received signal data, which represents a reconstructed total received signal, with higher quality signal data (e.g., representing higher quality signals) contributing relatively more to the total received signal data, and lower quality signal data (e.g., representing lower quality signals) contributing relatively less to the total received signal data.

In some examples, the spatial weights 225 may be predetermined; for example when steered beamforming occurs, the controller 120 and/or the device 100 may be operating the array 101 to receive signals from a particular direction (e.g., an Angle of Arrival (AoA)) and the spatial weights 225 may be predetermined for this particular direction. Indeed, the spatial weights 225 may comprise different sets of spatial weights 225 for particular directions. Put another way, the controller 120 and/or the device 100 may be further configured to (e.g., at the block 304): apply predetermined spatial weights 225 to the respective signal data to determine the total received signal data.

However, in other examples, the controller 120 and/or the device 100 may be further configured to (e.g., at the block 304): apply spatial weights 225 to the respective signal data to determine the total received signal data. The spatial weights 225 may be based on respective phases of the antenna devices 103 relative to a phase of an antenna device 103 which receives a set of the respective signal data having a best quality metric. Put another way, the spatial weights 225 may be based on which of the antenna devices receives a set of the respective signal data having a best quality metric. For example, a spatial weight for the antenna device 103 having the highest quality metric may be set to a value representing a 0° phase difference, with the remaining spatial weights determined with reference to this antenna device 103. In other words, in these examples, it is understood that a direction of a received signal may be determined from the respective signal data received on the respective antenna devices 103. Such a scheme may be referred to as dynamic beamforming.

At a block 306, the controller 120 and/or the device 100 compares a metric of the total received signal data to a threshold to determine whether the array 101 of the antenna devices 103 has received an incoming communication. For example, the total received signal data may represent a signal that represents an incoming communication, or the total received signal data may represent a signal that does not represent an incoming communication. An incoming communication may include one or more of a phone call, a text message, an email, modulated data, a "ping" from a cell-phone tower, a training data set, and/or any other type of communication that may be transmitted via a wireless communication network. A metric of the total received signal data may be determined that represents whether the array 101 of the antenna devices 103 has received an incoming communication. In some examples, such a metric may comprise a power of a correlation between total received signal data and the reference signal data 227.

For example, power of a correlation between signal data, that represents an incoming communication, and the reference signal data 227 (e.g., over the correlation time) may be higher than a threshold, which may include, but is not limited to, a given percentage, and the like, of power of a perfect correlation between received signal data and reference signal data. The threshold (e.g., threshold power) may be predetermined for a given communication network, and preconfigured at the device 100 (e.g., the threshold may be stored in a memory accessible to the controller 120, such as the memory 222). However, any suitable metric, and corresponding threshold, is within the scope of the present specification.

As depicted, the block 306 includes comparing the metric of the total received signal data to a threshold to determine whether the metric (e.g., a power of a correlation with the reference signal data, and the like), thereof is greater than a threshold.

In particular, the block 306 may include, but is not limited to determining, based on the total received signal data, whether the array 101 of the antenna devices 103 has received the incoming communication by: linearly combining the respective signal data (e.g., with the respective quality metric weights applied thereto, and the spatial weights 225); and comparing the total received signal data with reference signal data 227, for example to determine a correlation therebetween. Power of a correlation with the reference signal data 227 may be compared to a threshold power to determine whether power of the correlation is greater than the threshold power. Put another way, the block 306 may include determining a metric of the total received signal data 227; and comparing the metric to a threshold.

In response to the metric of the total received signal data being favorably compared to the threshold (e.g., a "YES" decision at the block 306), at a block 308, the controller 120 and/or the device 100 determines, based on the total received signal data, that the array 101 of the antenna devices 103 has received an incoming communication. The controller 120 and/or the device 100 may then process the incoming communication accordingly and/or operate the device 100 accordingly. For example, data modulating the incoming communication may be extracted therefrom and used to control associated applications and/or hardware at the device 100. In a particular example, when the incoming communication represents a telephone call, a phone application may be executed and a notification device 250 may be controlled to provide a notification of the telephone call.

However, in response to the metric of the total received signal data not being favorably compared to the threshold (e.g., a "NO" decision at the block 306), at a block 310, the controller 120 and/or the device 100 determines, based on the total received signal data, that the array 101 of the antenna devices 103 has not received an incoming communication; in these examples, no action may be taken by the controller 120 and/or the device.

The method 300 may repeat following block 308 and/or block 310. Indeed, the controller 220 and/or the device 100 may be further configured to one or more of continuously and periodically: determine whether the array 101 of the antenna devices 103 has received the incoming communication, for example as a function of time, as described in more detail below. In particular the quality metric weights may also change as a function of time, for example as the device 100 and/or the device 200 is moved and/or an environment of the device 100 and/or the device 200 changes (e.g., as perturbations of the antenna devices 103 change with time, so do the quality metric weights).

While the method 300 has been described with reference to the device 100 comprising a receiver and/or being operated as received, the device 100 may alternatively be operated as a transmitter using the respective quality metric weights. For example, the respective quality metric weights may be used to adjust and/or modify the predetermined spatial weights 225 (e.g., in the case of steered beamforming) or previously determined spatial weights 225 (e.g., in the case of spatial weights 225 in a previous instance of dynamic beamforming, as described above) to take into account perturbations at one or more of the antenna devices 103. In some of these examples, the spatial weights 225 may be determined based on ideal operating conditions of the array 101 of the antenna devices 103 where no perturbations occur. However, when perturbations occur, use of "ideal" predetermined spatial weights 225 may result in beamsteering in an unintended direction. As the quality metric weights indicate antenna devices 103 where perturbations are occurring, the quality metric weights may be used to adjust the "ideal" predetermined spatial weights 225 to achieve a desired beamsteering direction.

Put another way, the method 300 may include the controller 120 and/or the device 100 operating the array 101 of the antenna devices 103 as a transmitter, using the respective quality metric weights, for example to adjust ideal predetermined spatial weights 225 for a transmission.

Similarly, once an incoming communication is detected (e.g., at the block 308 of the method 300), respective quality metric weights may also be used to demodulate the total received signal data.

Put another way, a given set of perturbations at the antenna devices 103 result in quality metric weights which may be used to optimize received signal detection and received signal demodulation from a given spatial location; the quality metric weights may also be used in the reciprocal operation, transmission, to optimize signal transmission to the given location for the same given set of perturbations.

Figure 4:
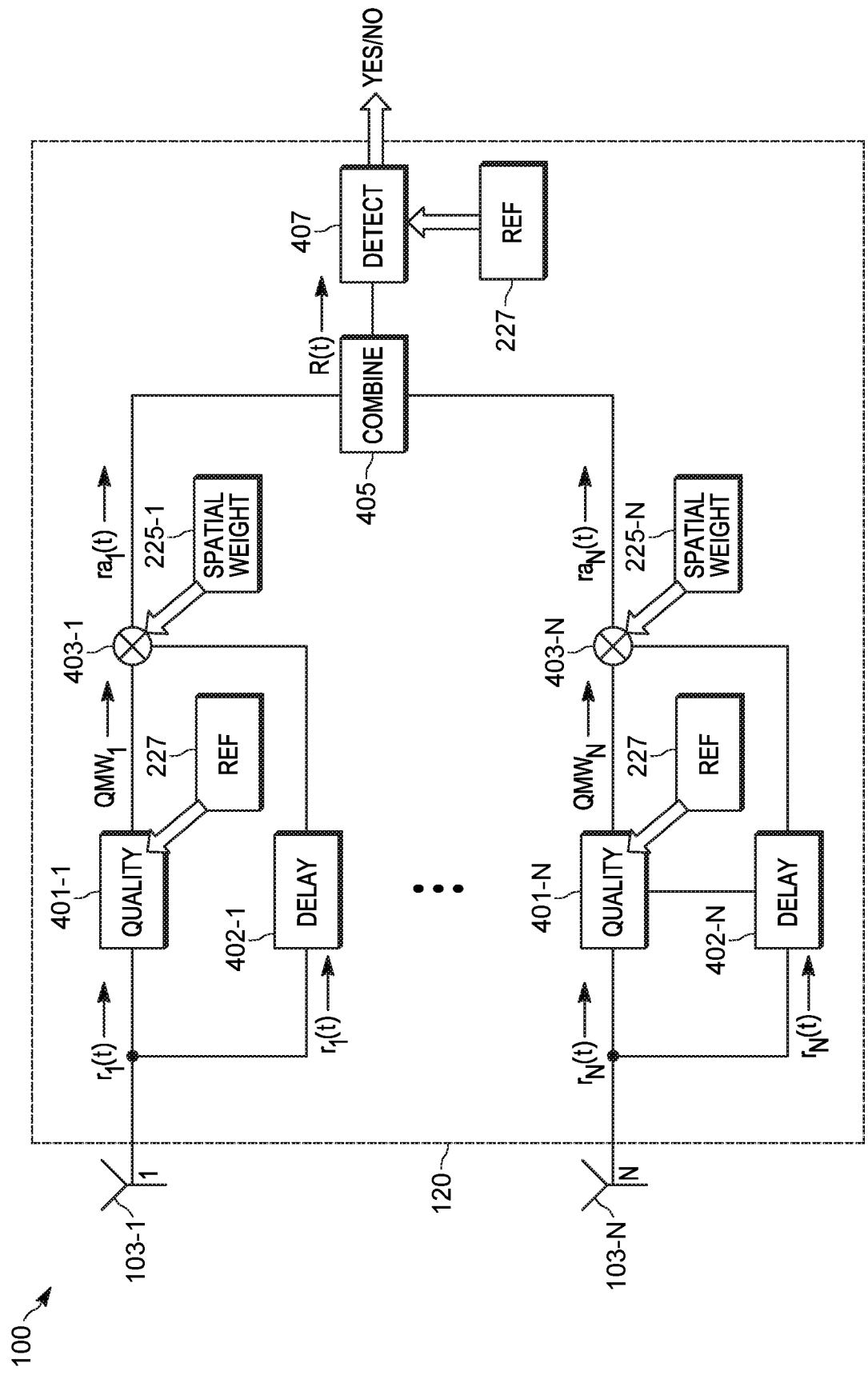
FIG. 4 is a functional block diagram of a device to determine incoming communications, in accordance with some examples.

Attention is next directed to FIG. 4 which depicts an example of the controller 120 implementing the method 300. In particular, FIG. 4 depicts a block diagram of example functional modules of the controller 120 which may represent aspects and/or blocks of the method 300 and/or the application 223 being implemented by the controller 120. The functionality of the controller 120 may be implemented in any suitable manner which may or may not include the example functional modules as depicted.

As depicted, the controller 120 implements quality modules 401-1 . . . 401-N, delay modules 402-1 . . . 402-N, adjusting modules 403-1 . . . 403-N, a combining module 405 and a detector module 407. The quality modules 401-1 . . . 401-N are interchangeably referred to hereafter, collectively, as the quality modules 401 and, generically, as a quality module 401; similarly, delay modules 402-1 . . . 402-N are interchangeably referred to hereafter, collectively, as the delay modules 402 and, generically, as a delay module 402; and similarly, adjusting modules 403-1 . . . 403-N are interchangeably referred to hereafter, collectively, as the adjusting modules 403 and, generically, as an adjusting module 403.

As depicted, there is a quality module 401, a delay module 402 and an adjusting module 403 for each antenna device 103 (e.g., there are "N" number of each of the quality modules 401, the delay modules 402 and the adjusting modules 403). However any suitable number of each of the modules 401, 402, 403 is within the scope of the present specification.

A given quality module 401 receives respective signal data $r_n(t)$ (e.g., data as a function of time that represents a received signal) for an associated antenna device 103. As depicted, the quality module 401-1 is receiving signal data $r_1(t)$ and the quality module 401-N is receiving signal data $r_N(t)$.

A quality module 401 determines a respective quality metric weight QMWn, which is provided to a respective adjusting module 402. As depicted, a quality module 401 determines a respective quality metric weight QMWn using received signal data $r_n(t)$ and reference signal data 227. As depicted, the quality module 401-1 is determining a quality metric weight $QMW_1$, and the quality module 401-N is determining a quality metric weight $QMW_N$.

A particular example of a quality metric weight is next described, though any suitable quality metric weight (e.g., as described above) is within the scope of the present specification. For example, a power of a correlation between the signal data $r_n(t)$ and reference signal data 227, as a function of time, may be determined using:

$$\text{peak}_n(t) = \left| \frac{1}{T} \int_0^T r_n(t - T + \tau) x^*(\tau) d\tau \right|^2 \quad \text{Equation (1)}$$

In Equation (1), $\text{peak}_n$, is power of the correlation between respective signal data $r_n(t)$ and the reference signal data 227, T is the correlation time, t is an arbitrary time such as a time that respective signal data $r_n(t)$ is received, r is a given time (e.g., a placeholder for the integration) and $x^*(\tau)$ represents a conjugate of the reference signal data 227. For example, respective signal data $r_n(t)$ and the reference signal data 227 may each be in the form of a matrix, and the like, and to determine a correlation therebetween, a matrix of the respective signal data $r_n(t)$ is multiplied by a conjugate of a respective matrix of the reference signal data 227. Furthermore, at a given time, t, the received signal data, $r_n(t)$, and reference signal data, $x^*(t)$, are integrated, as function of time, over the correlation time T to determine a correlation therebetween, and the peak (e.g., power of the correlation) may be determined by taking the absolute value of the integration and squaring the absolute value.

Furthermore, the power of the correlation, $\text{peak}_n$ is generally a function of time, and hence may be determined periodically and/or on an ongoing basis.

An average power of the respective signal data $r_n(\tau)$ may be determined from:

$$avg_n(t) = \left| \frac{1}{T} \int_{t-T}^t |r_n(\tau)|^2 d\tau \right|^2 \quad \text{Equation (2)}$$

In Equation (2), $avg_n$ is an average power of the respective signal data $r_n(\tau)$ determined by integrating a square of the respective signal data $r_n(\tau)$ over the correlation time (e.g., as function of time,) taking the absolute value of the integration and squaring the absolute value.

Furthermore, the average power, $avg_n$ is generally a function of time, and hence may be determined periodically and/or on an ongoing basis.

Comparing Equation (1), which is integrated from 0 to T seconds (and the like) for $r_n(t-T+\tau)$ and Equation (2), which is integrated from t–T to t seconds (and the like) for $r_n(\tau)$, it is apparent that $\text{peak}_n$ is determined for "T" seconds, and the like, in the past, while $avg_n$ is determined for the last "T" seconds, each relative to a time "t" at which a determination of each occurs.

A quality metric weight may be determined from:

$$QMW_n(t) = \frac{\text{peak}_n}{avg_n} \quad \text{Equation (3)}$$

In other words, a quality metric weight $QMW_n$ for a respective signal data $r_n(\tau)$ and/or an antenna device 103 thereof may be a peak-to-average power ratio.

Comparing Equation (1), Equation (2), and Equation (3), it is apparent that the division by "T" in Equation (1) and Equation (2) is optional. It is understood that when a division by "T" occurs in Equation (1) and Equation (2), peak and average power are determined, and when a division by "T" does not occur in Equation (1) and Equation (2), peak and average energy are determined. Hence the quality metric weight, $QMW_n$ may be a peak-to-average power ratio and/or a peak-to-average energy ratio.

Furthermore, the quality metric weight, $QMW_n$ is generally a function of time, and hence may be determined periodically and/or on an ongoing basis.

As depicted, the delay modules 402 receive and delay (e.g., store at least temporarily) respective signal data $r_n(t)$ by T seconds, where T is the correlation time, so that a respective quality module 401 may determine a respective quality metric weight.

The adjusting modules 403 receive a respective quality metric weight $QMW_n$ from a respective quality module 401 and a respective signal data $r_n(t)$ from a respective delay module 402, and linearly combine the respective quality metric weight $QMW_n$ and the respective signal data $r_n(t)$, for example with a respective spatial weight 225 to produce respective adjusted signal $data_n ra_n(t)$. As depicted, the adjusting module 403-1 is determining adjusted signal data $ra_1(\tau)$ from a quality metric weight $QMW_1$, and signal data $r_1(t)$, as well as a spatial weight 225-1; similarly, the adjusting module 403-N is determining adjusted signal data $ra_N(t)$ from a quality metric weight $QMW_N$, and signal data $r_N(t)$, as well as a spatial weight 225-N. Adjusted signal data $ra_n(t)$ hence represents signal data $r_n(t)$ adjusted for phase (e.g., respective phase of the respective signal data $r_n(t)$ is aligned) and adjusted for a respective $QMW_n$.

The combining module 405 receives the respective adjusted signal data $ra_n(t)$ and, for example, combines and/or sums the respective adjusted signal data $ra_n(t)$ for each antenna device 103 to determine total received signal data R (t). The total received signal data R (t) represents a total signal received by the antenna devices 103, with greater weight given to signals from antenna devices 103 having lower perturbations and vice versa, as described above.

The detector module 407 may determine whether or not the total received signal data R (t) is an incoming communication by determining power of a correlation between the total received signal data R (t) and the reference signal data 227, and comparing the power of the correlation to a threshold power, as described above. Power of a correlation between the total received signal data R (t) and the reference signal data 227 quality metric weight may be determined from:

$$DETECT(t) = \left| \frac{1}{T} \int_0^T R(t - T + \tau) x^*(\tau) d\tau \right|^2 \quad \text{Equation (4)}$$

Similar to Equation (1), Equation (4) represents a determination of a power of a correlation, DETECT(t), between total received signal data R(t) and the reference signal data 227 (e.g., a conjugate $x^*(\tau)$ thereof). The detector module 407 may compare power of a correlation to a threshold power (e.g., based on a power of a correlation with an ideal total received signal data) to determine whether the detect data indicates an incoming communication or not. For example, as depicted, the detector module 407 may output data representing "YES" or "NO" which may be used to control a notification device 250. Put another way, power of a correlation, DETECT(t) may comprise the metric of the block 306 of the method 300.

Furthermore, the power of a correlation, DETECT(t) is generally determined as function of time, and hence the power of a correlation, DETECT(t) may change with time depending on whether the total received signal data represents an incoming communication. When the power of a correlation, DETECT(t) exceeds the threshold power, and the total received signal data represents an incoming communication, the device 200 may demodulate total received signal data to determine data of the incoming communication.

In some examples, an energy of correlation may be determined for example similar to the power of a correlation, DETECT(t) of Equation (4), but without dividing by the correlation time T; in these examples, the energy of correlation may be compared to a threshold energy (e.g., similar to the threshold power but multiplied by the correlation time T).

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A device comprising:
an array of antenna devices; and
a controller configured to:
    determine respective quality metric weights for respective signal data representing respective signals received by the antenna devices by: comparing the respective signal data to reference signal data stored at a memory accessible to the controller, the reference signal data corresponding to a reference signal;
    apply the respective quality metric weights to the respective signal data to determine total received signal data; and
    determine, based on the total received signal data, that the array of the antenna devices has received an incoming communication.

2. The device of claim 1, wherein the respective quality metric weights comprise a peak-to-average power ratio.

3. The device of claim 1, wherein the respective quality metric weights comprises weights derived from one or more of: eigen decomposition weight; singular value decomposition; and principle component analysis.

4. The device of claim 1, wherein, for steered beamforming, the controller is further configured to:
    apply predetermined spatial weights to the respective signal data to determine the total received signal data.

5. The device of claim 1, wherein the controller is further configured to:
    apply spatial weights to the respective signal data to determine the total received signal data, the spatial weights based on which of the antenna devices receives a set of the respective signal data having a best quality metric.

6. The device of claim 1, wherein the controller is further configured to determine, based on the total received signal data, that the array of the antenna devices has received the incoming communication by:
    linearly combining the respective signal data with the respective quality metric weights applied thereto to determine the total received signal data; and
    comparing the total received signal data with the reference signal data.

7. The device of claim 1, wherein the controller is further configured to determine, based on the total received signal data, that the array of the antenna devices has received the incoming communication by:
    determining a metric of the total received signal data; and
    comparing the metric to a threshold.

8. The device of claim 1, wherein the controller is further configured to one or more of continuously and periodically:
    determine whether the array of the antenna devices has received the incoming communication.

9. The device of claim 1, wherein the controller is further configured to:
    operate the array of the antenna devices as a transmitter, based at least partially on the respective quality metric weights.

10. A method comprising:
    determining, at a device in communication with an array of antenna devices, respective quality metric weights for respective signal data representing respective signals received by the antenna devices by: comparing the respective signal data to reference signal data stored at a memory accessible to the device, the reference signal data corresponding to a reference signal;
    applying, at the device, the respective quality metric weights to the respective signal data to determine total received signal data; and
    determining, at the device, based on the total received signal data, that the array of the antenna devices has received an incoming communication.

11. The method of claim 10, wherein the respective quality metric weights comprise a peak-to-average power ratio.

12. The method of claim 10, wherein the respective quality metric weights comprises weights derived from one or more of: eigen decomposition weight; singular value decomposition; and principle component analysis.

13. The method of claim 10, further comprising, for steered beamforming:
    applying predetermined spatial weights to the respective signal data to determine the total received signal data.

14. The method of claim 10, further comprising:
    applying spatial weights to the respective signal data to determine the total received signal data, the spatial weights based on which of the antenna devices receives a set of the respective signal data having a best quality metric.

15. The method of claim 10, further comprising determining, based on the total received signal data, that the array of the antenna devices has received the incoming communication by:

linearly combining the respective signal data with the respective quality metric weights applied thereto to determine the total received signal data; and comparing the total received signal data with the reference signal data.

16. The method of claim 10, further comprising determining, based on the total received signal data, that the array of the antenna devices has received the incoming communication by:

determining a metric of the total received signal data; and comparing the metric to a threshold.

17. The method of claim 10, further comprising one or more of continuously and periodically:

determining whether the array of the antenna devices has received the incoming communication.

18. The method of claim 10, further comprising:

operating the array of the antenna devices as a transmitter, based at least partially on the respective quality metric weights.

19. A device comprising:

an array of antenna devices; and a controller configured to:

determine respective quality metric weights for respective signal data representing respective signals received by the antenna devices;

apply the respective quality metric weights to the respective signal data to determine total received signal data; and determine, based on the total received signal data, that the array of the antenna devices has received an incoming communication by one or more of:

linearly combining the respective signal data with the respective quality metric weights applied thereto to determine the total received signal data; and comparing the total received signal data with reference signal data; and, determining a metric of the total received signal data; and comparing the metric to a threshold.

* * * * *